(12) United States Patent
Newman et al.

(10) Patent No.: US 8,568,940 B2
(45) Date of Patent: Oct. 29, 2013

(54) JOINING BIPOLAR PLATES USING LOCALIZED ELECTRICAL NODES

(75) Inventors: Keith E. Newman, Pittsford, NY (US); Michael K. Budinski, Pittsford, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1499 days.

(21) Appl. No.: 11/752,993

(22) Filed: May 24, 2007

(65) Prior Publication Data

US 2008/0292916 A1 Nov. 27, 2008

(51) Int. Cl.
*H01M 8/02* (2006.01)

(52) U.S. Cl.
USPC .......................................... 429/507; 429/409

(58) Field of Classification Search
USPC ............... 429/12, 34, 35, 36, 37, 38, 39, 507, 429/518, 409, 457, 460
See application file for complete search history.

(56) References Cited

U.S. PATENT DOCUMENTS

| | | |
|---|---|---|
| 5,776,624 A | 7/1998 | Neutzler |
| 6,887,610 B2 | 5/2005 | Elhamid et al. |
| 6,942,941 B2 | 9/2005 | Blunk et al. |
| 6,974,648 B2 | 12/2005 | Goebel |
| 7,009,136 B2 | 3/2006 | Schlag |
| 7,459,227 B2 * | 12/2008 | Rock et al. ............... 429/34 |
| 2006/0127706 A1 | 6/2006 | Goebel et al. |
| 2007/0287057 A1 * | 12/2007 | Elhamid et al. ............ 429/38 |
| 2008/0286619 A1 * | 11/2008 | Lai ........................... 429/13 |

FOREIGN PATENT DOCUMENTS

| | | |
|---|---|---|
| CN | 1650458 A | 3/2005 |
| CN | 1742400 A | 1/2006 |
| DE | 102 21 951 | 12/2003 |
| DE | 10 2005 020 332 | 11/2006 |
| DE | 11 2004 001 443 | 3/2008 |

* cited by examiner

*Primary Examiner* — Mark F Huff
*Assistant Examiner* — Monique Wills
(74) *Attorney, Agent, or Firm* — Fraser Clemens Martin & Miller LLC; J. Douglas Miller

(57) ABSTRACT

A bipolar plate assembly for a fuel cell is provided. The bipolar plate assembly includes a first unipolar plate disposed adjacent to a second unipolar plate. The first unipolar plate and the second unipolar plate are bonded by a plurality of localized electrically conductive nodes. A fuel cell stack including the bipolar plate assembly and a method for preparing the bipolar plate assembly are also described.

20 Claims, 3 Drawing Sheets

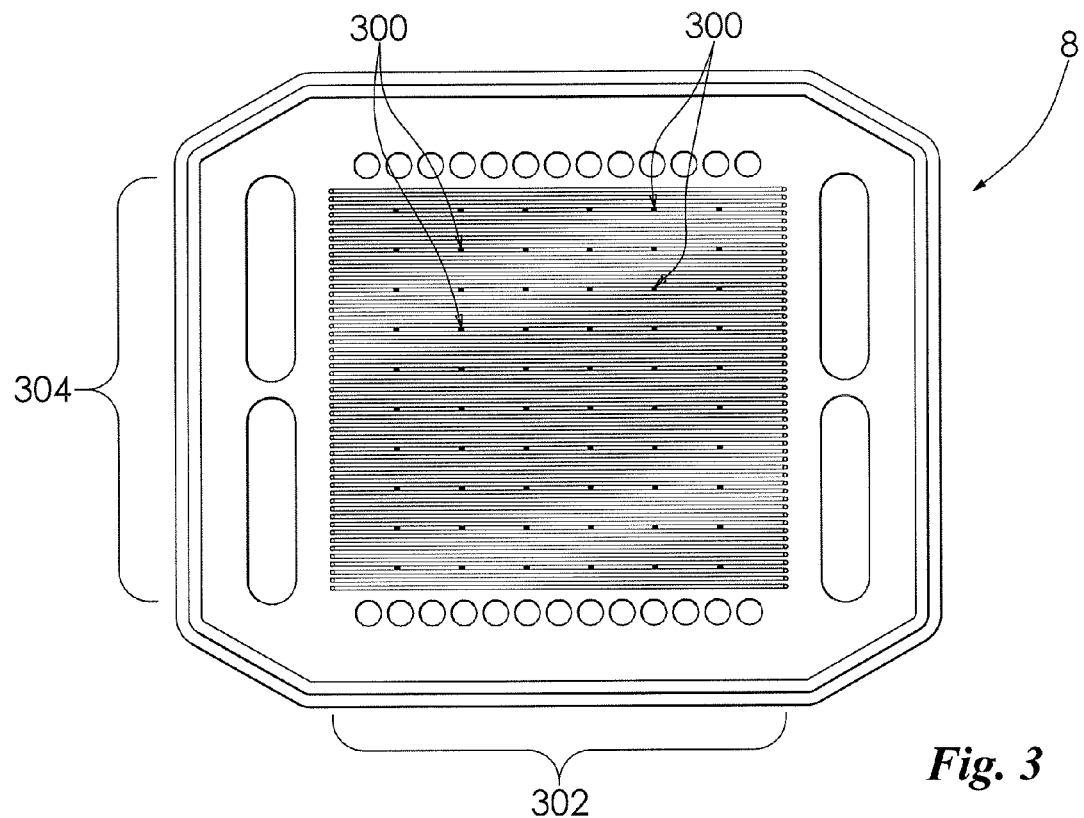
Fig. 3
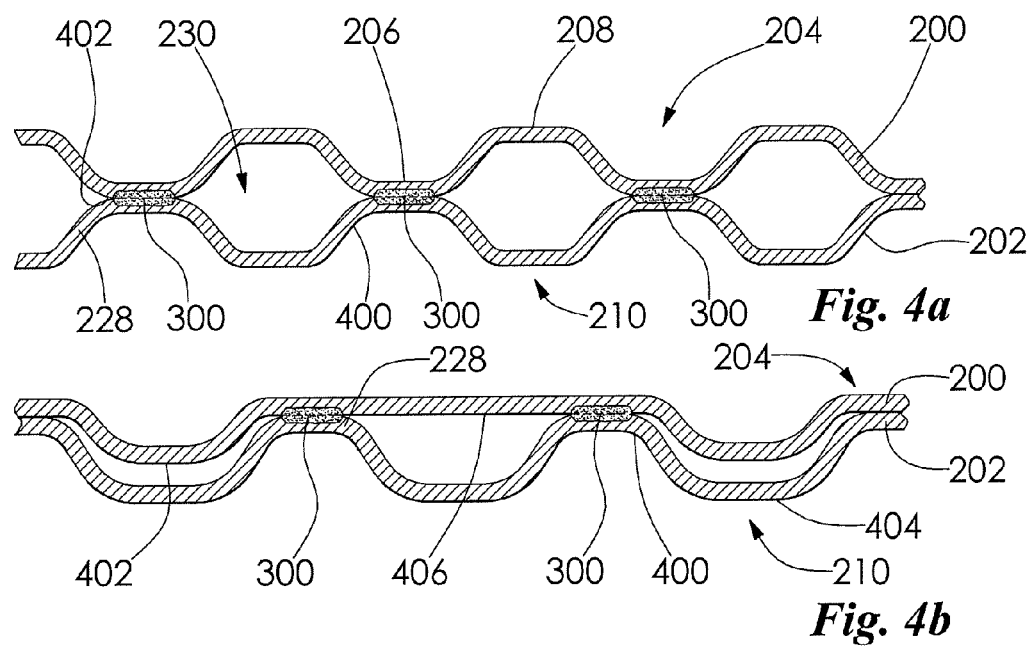
Fig. 4a
Fig. 4b

JOINING BIPOLAR PLATES USING LOCALIZED ELECTRICAL NODES

FIELD OF THE INVENTION

The present disclosure relates to fuel cell stacks and, more particularly, to a bipolar plate assembly and methods for preparing bipolar plates for fuel cell stacks.

BACKGROUND OF THE INVENTION

A fuel cell has been proposed as a clean, efficient and environmentally responsible power source for electric vehicles and various other applications. One example of the fuel cell is a Proton Exchange Membrane (PEM) fuel cell. The PEM fuel cell includes a membrane-electrode-assembly (MEA) that generally has a thin, solid polymer membrane-electrolyte having an anode and a cathode with a catalyst on opposite faces of the membrane-electrolyte. The MEA is generally disposed between a pair of porous conductive materials, also known as gas diffusion media, which distribute gaseous reactants, e.g. hydrogen and oxygen/air, to the anode and cathode layers. The hydrogen reactant is introduced at the anode where it reacts electrochemically in the presence of the catalyst to produce electrons and protons. The electrons are conducted from the anode to the cathode through an electrical circuit disposed therebetween. Simultaneously, the protons pass through the electrolyte to the cathode where an oxidant, such as oxygen or air, reacts electrochemically in the presence of the electrolyte and catalyst to produce oxygen anions. The oxygen anions react with the protons to form water as a reaction product.

The MEA of the PEM fuel cell is sandwiched between a pair of electrically-conductive bipolar plates which serve as current collectors for the anode and cathode layers. The bipolar plates include a plurality of lands and flow channels for distributing the gaseous reactants to the anodes and cathodes of the fuel cell. The bipolar plates serve as an electrical conductor between adjacent fuel cells and are further provided with a plurality of internal coolant channels adapted to exchange heat with the fuel cell when a coolant flows therethrough. The typical bipolar plate is a joined assembly constructed from two separate unipolar plates. Each unipolar plate has an exterior surface having flow channels for the gaseous reactants and an interior surface with the coolant channels. In order to conduct electrical current between the anodes and cathodes of adjacent fuel cells in the fuel cell stack, the paired unipolar plates forming each bipolar plate assembly are mechanically and electrically joined.

A variety of bipolar plate assemblies and methods for preparing bipolar plate assemblies are known in the art. For example, it is reported by Neutzler in U.S. Pat. No. 5,776,624, incorporated herein by referenced in its entirety, that a bipolar plate including corrosion-resistant metal sheets may be brazed together so as to provide a passage between the sheets through which a dielectric coolant flows. Further, U.S. Pat. No. 6,887,610 to Abd Elhamid, et al., incorporated herein by reference in its entirety, discloses a bipolar plate assembly without welding or brazing that includes an electrically conductive layer deposited over the coolant channels and lands and a fluid seal disposed between the inside facing surface about a perimeter of the coolant channels. Also, U.S. Pat. No. 6,942,941 to Blunk et al., incorporated herein by reference in its entirety, recites a bipolar plate having a first and second surface that are coated with an electrically conductive primer coating and joined to one another by an electrically conductive adhesive. Schlag in U.S. Pat. No. 7,009,136, incorporated herein by reference in its entirety, describes a method of fabrication adapted to weld bipolar plates together using a partial vacuum that holds paired unipolar plates together during the welding process.

There is a continuing need for a bipolar plate assembly having an efficient and robust internal architecture that provides an optimized electrical contact between the plates of the assembly. A method for rapidly preparing the bipolar plate assembly applicable to conventional flowfield designs is also desired.

SUMMARY OF THE INVENTION

In concordance with the instant disclosure, a bipolar plate assembly having an efficient and robust architecture, an optimized electrical contact between the plates of the assembly, and a method for rapidly preparing the assembly that is applicable to conventional flowfield patterns is surprisingly discovered.

In one embodiment, a bipolar plate assembly for a fuel cell is provided. The bipolar plate assembly includes a fuel cell having a first unipolar plate disposed adjacent a second unipolar plate. The first and second unipolar plates are bonded by a plurality of localized electrically conductive nodes.

In another embodiment, a fuel cell stack having the bipolar plate assembly is provided. The fuel cell stack further includes a plurality of membrane electrode assemblies arranged in a stacked configuration, each of the plurality of membrane electrode assemblies having a cathode and an anode.

In a further embodiment, a method for preparing the bipolar plate assembly is provided. The method includes the steps of providing the first unipolar plate having the first inner surface, providing the second unipolar plate having the second inner surface, positioning the first inner surface adjacent the second inner surface, and bonding the first unipolar plate and the second unipolar plate with the plurality of localized electrically conductive nodes.

DRAWINGS

The above, as well as other advantages of the present disclosure, will become readily apparent to those skilled in the art from the following detailed description, particularly when considered in the light of the drawings described herein.

FIG. 3 is a top plan view of the joined bipolar plate assembly depicted in FIGS. 2a and 2b, showing a distribution of localized electrical nodes;

FIG. 4a is a fragmentary cross-sectional side view taken along line 4-4 of FIG. 2a, showing a non-nested configuration of the localized electrical nodes in the bipolar plate assembly; and FIG. 4b is a fragmentary cross-sectional side view taken along line 4-4 of FIG. 2a, showing a nested configuration of the localized electrical connections in the bipolar plate assembly.

DETAILED DESCRIPTION OF THE INVENTION

Figure 1:
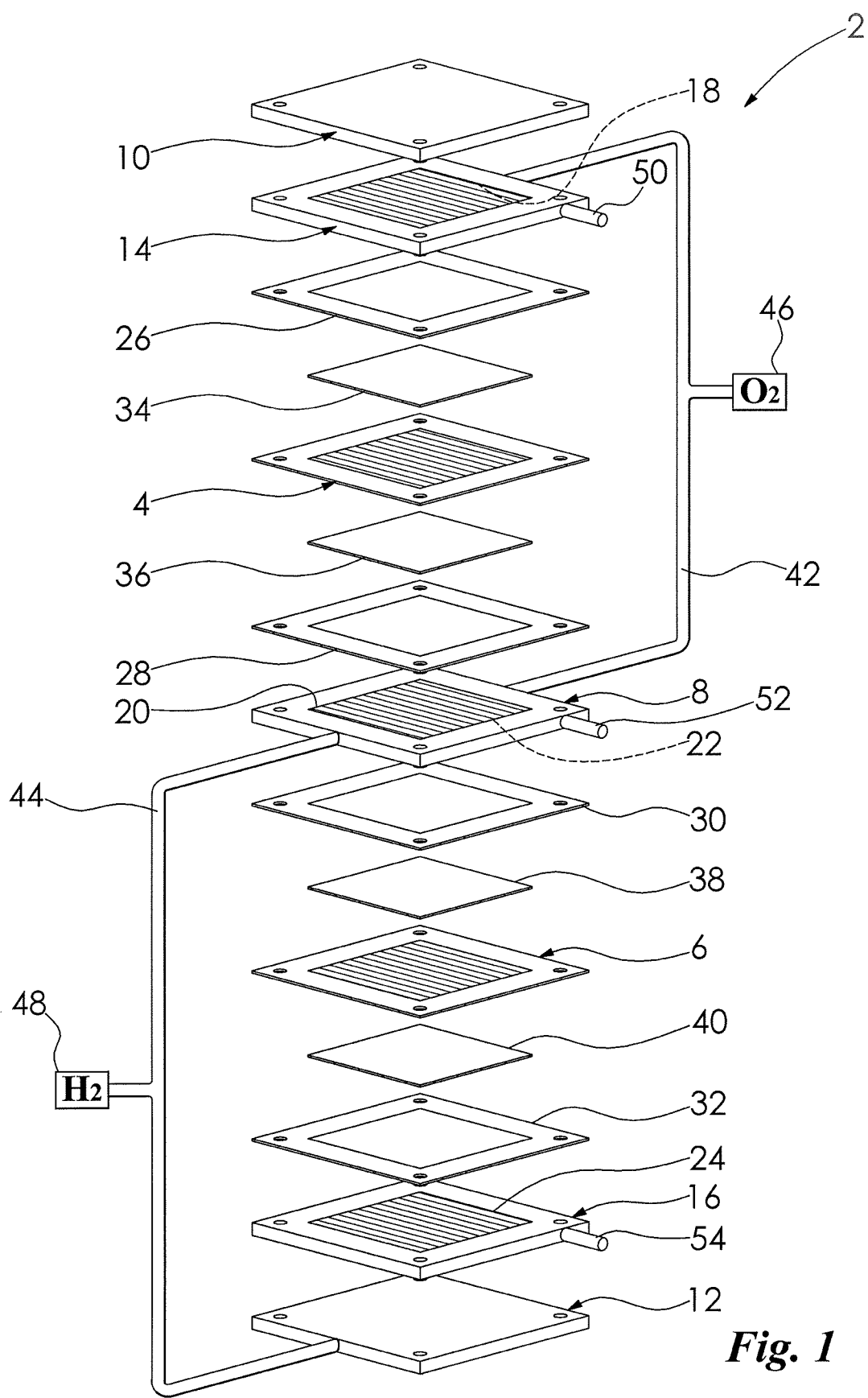
FIG. 1 illustrates a schematic, exploded perspective view of a PEM fuel cell stack (showing only two cells)

The following description is merely exemplary in nature and is not intended to limit the present disclosure, application, or uses. It should also be understood that throughout the drawings, corresponding reference numerals indicate like or corresponding parts and features. In respect of the methods disclosed, the steps presented are exemplary in nature, and thus, are not necessary or critical.

For simplicity, only a two-cell stack (i.e. one bipolar plate) is illustrated and described herein, it being understood that a typical stack will have many more such cells and bipolar plates.

FIG. 1 depicts a two cell PEM fuel cell stack 2 having a pair of membrane-electrode-assemblies (MEAs) 4, 6 separated from each other by an electrically conductive fluid distribution element 8, hereinafter bipolar plate assembly 8. The MEAs 4, 6 and bipolar plate assembly 8, are stacked together between end plates 10, 12, and end contact elements 14, 16. The end contact elements 14, 16 and the bipolar plate assembly 8 include working faces 18, 20, 22, 24, respectively, for distributing fuel and oxidant gases (e.g., $H_2$ and $O_2$) to the MEAs 4, 6. Nonconductive gaskets 26, 28, 30, 32 provide seals and electrical insulation between the several components of the fuel cell stack 2.

The MEAs 4, 6 are disposed adjacent gas permeable conductive materials known as gas diffusion media 34, 36, 38, 40. The gas diffusion media 34, 36, 38, 40 may include carbon or graphite diffusion paper. The gas diffusion media 34, 36, 38, 40 contact the MEAs 4, 6. The end contact units 14, 16 contacts the gas diffusion media 34, 40 respectively. The bipolar plate assembly 8 contacts the gas diffusion media 36 on the anode face of MEA 4, configured to accept hydrogen-bearing reactant, and also contacts gas diffusion medium 38 on the cathode face of MEA 6, configured to accept oxygen-bearing reactant. Oxygen is supplied to the cathode side of the fuel cell stack 2 from storage tank 46, for example, via an appropriate supply conduit 42. Hydrogen is supplied to the anode side of the fuel cell from a storage tank 48, for example, via an appropriate supply conduit 44. Alternatively, ambient air may be supplied to the cathode side as an oxygen source and hydrogen to the anode from a methanol or gasoline reformer, and the like. Exhaust conduits (not shown) for both the anode and cathode sides of the MEAs 4, 6 are also provided. Additional conduits 50, 52, 54 are provided for supplying liquid coolant to the bipolar plate assembly 8 and end plates 14, 16. Appropriate conduits for exhausting coolant from the bipolar plate assembly 8 and end plates 14,16 are also provided (not shown).

Figure 2A:
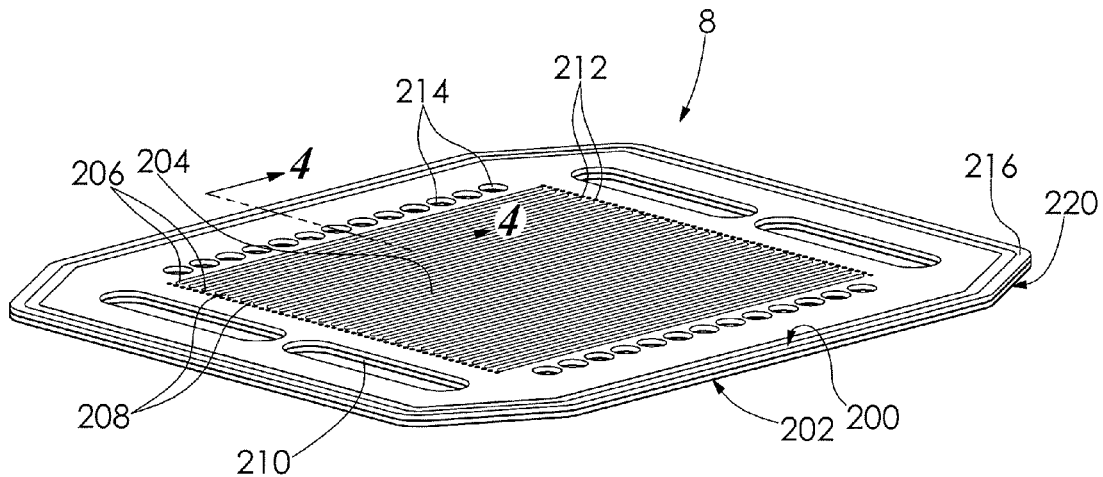
FIG. 2a is a perspective view of a joined bipolar plate assembly according to an embodiment of the present disclosure.
Figure 2B:
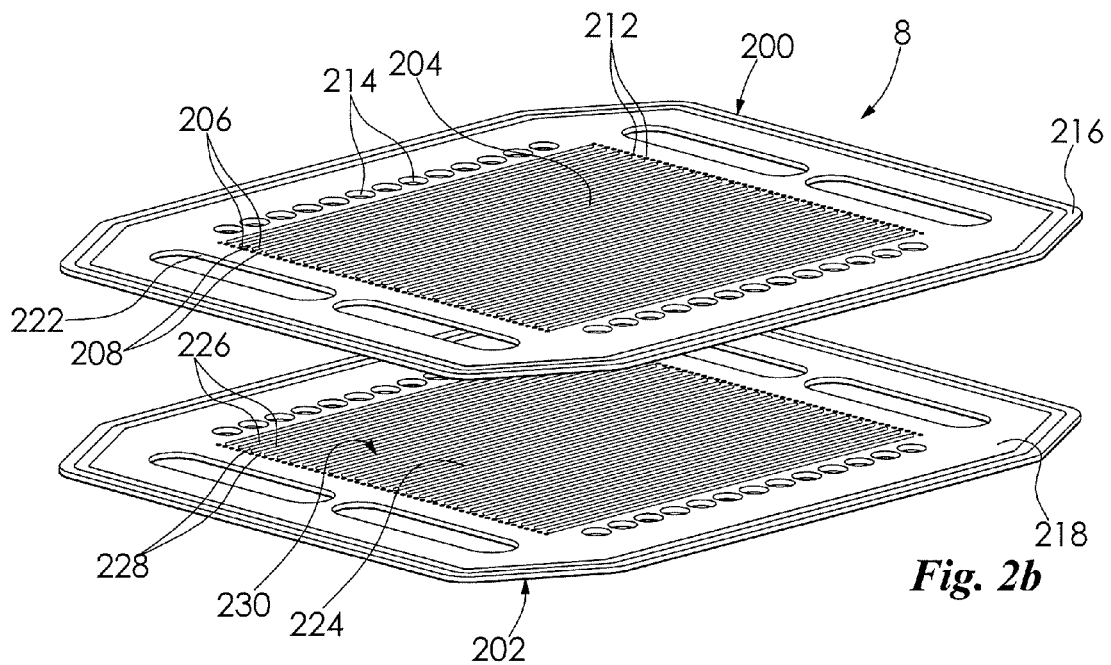
FIG. 2b is an exploded perspective view of the electrically conductive bipolar plate assembly depicted in FIG. 2a, further showing a first unipolar plate and a second unipolar plate, each having a plurality of reactant gas channels and lands and a plurality of coolant channels and lands.

Referring next to FIGS. 2a and 2b, the bipolar plate assembly 8 is shown in greater detail. The bipolar plate assembly 8 includes a first unipolar plate 200 and a second unipolar plate 202. The first unipolar plate 200 has a first active surface 204 with a plurality of first flow channels 206 formed therein. The plurality of first flow channels 206 is adapted to distribute the fuel and oxidant gases across the first active surface 204. The plurality of first flow channels 206 define a plurality of lands 208 disposed therebetween. Similar pluralities of second flow channels (shown in FIGS. 4a and 4b) and second lands (shown in FIGS. 4a and 4b) are formed on a second active surface 210 of the second unipolar plate 202.

The bipolar plate assembly 8 further includes a plurality of gas ports 212 and a plurality of coolant ports 214 formed in the first unipolar plate 200 and the second unipolar plate 202. The gas ports 212 and the coolant ports 214 provide inlet and outlet passages for the fuel, the oxidant, and the coolant to flow through the bipolar plate assembly 8. A skilled artisan should understand that various configurations of the flow channels 206, the lands 208, the gas ports 212, and the coolant ports 214 may be used as desired. It should also be recognized that the present disclosure is not limited to a particular flow field pattern, but has application to bipolar plate assemblies independent of the flow field pattern.

In a further embodiment, the first unipolar plate 200 includes a first perimeter flange 216 and the second unipolar plate 202 includes a second perimeter flange 218. Upon alignment and assembly of the bipolar plate assembly 8, the first perimeter flange 216 and the second perimeter flange 218 cooperate to form a perimeter 220 of the bipolar plate assembly 8.

As is best depicted in FIG. 2b, the first unipolar plate 200 has a first inner surface 222 and the second unipolar plate 202 has a second inner surface 224. The second inner surface 224 includes a plurality of second coolant channels 226 formed therein. The plurality of second coolant channels 226 is adapted to distribute a coolant to the second inner surface 224, thereby modulating a temperature of the bipolar plate assembly 8 and fuel cell stack 2. The plurality of second coolant channels 226 define a plurality of second coolant lands 228 that is disposed therebetween. A skilled artisan should appreciated that similar pluralities of first coolant channels (shown in FIGS. 4a and 4b) and first coolant lands (shown in FIGS. 4a and 4b) are formed on the first inner surface 222 of the first unipolar plate 200. The plurality of first coolant channels and the plurality of second coolant channels 226 are adapted to cooperate upon assembly of the bipolar plate assembly 8 and form a coolant flowfield 230 in an interior of the bipolar plate assembly 8. It should also be recognized that the present disclosure is not limited to a particular coolant flowfield pattern, but has application to bipolar plate assemblies independent of the coolant flowfield pattern.

The first and second unipolar plates 200, 202 are formed from an electrically conductive material. Suitable materials include, for example, a metal, a metal alloy, or a composite material. The metals, metal alloys, and composite materials have sufficient durability and rigidity to function as sheets in the bipolar plate assembly 8 of the fuel cell stack 2. Additional design properties considered in selecting a material for the unipolar plates 200, 202 include gas permeability, conductivity, density, thermal conductivity, corrosion resistance, pattern definition, thermal and pattern stability, machinability, joinability, and availability. Suitable metals and metal alloys include, but are not limited to, aluminum, titanium, platinum, stainless steel, carbon steel, nickel-based alloys, tantalum, niobium, and alloys and combinations thereof. Composite materials include, but are not limited to, graphite, graphite foil, conductive particles (e.g. graphite powders) in a polymer matrix, carbon fiber paper and polymer laminates, polymer plates with metal cores, conductively coated polymer plates, and combinations thereof, for example.

The first and second unipolar plates 200, 202 are typically thin. For example, the first and second unipolar plates 200, 202 may have a thickness of about 0.05 mm to about 0.5 mm. It should be understood that other thicknesses may be used as desired. The first and second unipolar plates 200, 202 are also formed by any method known in the art, including machining, molding, cutting, carving, stamping, photo-etching, such as through a photolithographic mask, or any other suitable design and manufacturing process. It is contemplated that the unipolar plates 200, 202 may include a laminate structure having a flat sheet and an additional sheet including a series of external fluid flow channels.

In certain embodiments, at least one of the active surfaces 204, 210 and the inner surfaces 222, 224 of the unipolar plates 200, 202 have a coating (not shown). The coating may be adapted to provide corrosion resistance, thermal conductivity, and optimized electrical conductivity and contact resistance, for example. In embodiments where the inner surfaces 222, 224 are coated, the coating may facilitate electrical flow formed by metal to metal contact of the respective coatings on each of the inner surfaces 222, 224.

As nonlimiting example, the coating includes noble metals, metal oxides and combinations thereof. Suitable noble metals for coatings include gold (Au), silver (Ag), iridium (Ir), ruthenium (Ru), rhodium (Rh), osmium (Os), palladium (Pd) and platinum (Pt), for example. In particular embodiments, the metal employed for the coating of the active surfaces 204, 210 is gold (Au). Suitable metal oxides for the coating, but are not limited to, hafnium dioxide ($HfO_2$), zirconium dioxide ($ZrO_2$), aluminum oxide ($Al_2O_3$), tin oxide ($SnO_2$), tantalum pent-oxide ($Ta_2O_5$), niobium pent-oxide ($Nb_2O_5$), molybdenum dioxide ($MoO_2$), iridium dioxide ($IrO_2$), ruthenium dioxide ($RuO_2$) and mixtures thereof. The coatings are typically applied using any commercially available process. As nonlimiting examples, the coatings are applied by one of electroplating, electro-less plating, and physical vapor deposition. It should be understood that other suitable methods for applying the coatings may be used as desired.

In particular embodiments, the coating is hydrophilic and is adapted to facilitate a removal of liquid water from the active surfaces 204, 210 during operation of the fuel cell stack 2. Suitable hydrophilic coatings may include the noble metal coatings as described herein and as known in the art. Further suitable hydrophilic coatings are described, for example, in copending U.S. patent application. Ser. Nos. 11/068,489, 11/463,386, and 11/463,384, incorporated herein by reference in their entirety. As nonlimiting examples, the coating can include at least one Si—O group, at least one polar group and at least one group including a saturated or unsaturated carbon chain. In further embodiments the coating comprises at least one Si—O group and an Si—R group, wherein R includes a saturated or unsaturated carbon chain and the molar ratio of Si—R groups to Si—O groups ranges from $\frac{1}{8}$ to $\frac{1}{2}$. The coating may also be applied by any means sufficient for applying hydrophilic coatings. Suitable hydrophilic coatings can also includes nanoparticles having a size ranging from 1 to 100 nanometers, wherein the nanoparticles comprise a compound comprising a Si—O group, a saturated or unsaturated carbon chain and a polar group. It should be appreciated that other hydrophilic coatings can also be used.

The hydrophilic coatings may be applied by any suitable method including, but not limited to, laminating (such as by hot rolling), brushing, spraying, spreading, coil coating, silk screening, powder coating, and screen printing. Multiple coats of the coating may also be applied as desired.

In a particular embodiment of the present disclosure, the first inner surface 222 of the first unipolar plate 200 is disposed adjacent to the second inner surface 224 of the second unipolar plate 202. As shown in FIG. 3, the first and second unipolar plates 200, 202 are bonded by a plurality of localized electrically conductive nodes 300. The plurality of electrically conductive nodes 300 provide an electrically conductive path that allows the bipolar plate assembly 8 to function as a current collector within the fuel cell stack 2.

The plurality of electrically conductive nodes 300 are formed from at least one of a weld, a solder joint, a braze joint, and an adhesive, for example. It should be understood that the plurality of electrically conductive nodes 300 is formed from a material having a sufficient electrical conductivity for the bipolar plate assembly 8 to be employed as a current collector in the fuel cell stack 2. It should further be appreciated that the weld, solder joints, and braze joints are employed when the unipolar plates 200, 202 are formed from metal or metal alloys, and that the adhesives are employed with unipolar plates 200, 202 from either metallic or composite materials.

In one embodiment, the electrically conductive nodes 300 are spot welds. For example, the spot welds are provided by resistance spot welding, laser welding, or electron-beam welding. When the nodes 300 are spot welds, it should be understood that the nodes 300 are formed from substantially the same material as the first and second unipolar plates 200, 202. The spot welds may also be formed from projections disposed on the inner surfaces 222, 224 of the unipolar plates 200, 202, which are subsequently welded in a process known as projection welding. Suitable projections may be stamped into the unipolar plates 200, 202. It should be understood, however, that projection welding may provide less consistent welds than spot welding by resistance welding, laser welding, and electron-beam welding, for example. The spot welds both rigidly bond the inner surfaces 222, 224 and provide an electrical pathway between the first and second unipolar plates 200, 202.

In further embodiments, the plurality of electrically conductive nodes 300 is the solder joints or the braze joints. Suitable soldering and brazing techniques for forming the plurality of conductive nodes are known in the art. For example, soldering and brazing employ the use of a filler material. Soldering is generally understood to be employed with filler materials having a melting point below 450° C. (800° F.) and brazing is employed with filler materials having a melting point above 450° C. As a nonlimiting example, localized foils of the soldering or brazing material may be disposed between the first and second inner surfaces 222, 224 and then heated to the appropriate melting temperature to form the plurality of electrically conductive nodes 300. It should be understood that alternative soldering and brazing techniques may be employed as desired.

Suitable metal for the solder joints and the braze joints include electrically conductive materials that are substantially insoluble in the coolant desired to be pumped through the fuel cell stack 2. For example, when water is to be used as the coolant, acceptable metals for the soldering or brazing materials include chromium, nickel, silver, gold, platinum, and titanium, and alloys thereof. A skilled artisan should appreciate that other soldering and brazing materials may also be employed.

The plurality of electrically conductive nodes 300 may further be formed from an adhesive. As a nonlimiting example, the adhesive is a polymeric resin such as a thermosetting or thermoplastic resin. Suitable polymeric resins include, but are not limited to, polyamide imides, polyimides, poly vinyl esters, epoxides, phenolics, novolacs, urethanes, polyesters, polybismaleimides, polyanalines, polypyroles, and combinations thereof. In certain embodiments, the polymeric resin includes an electrically conductive filler. Suitable electrically conductive fillers include, but are not limited to, powders or particles of noble metals such as gold, platinum, silver, and palladium, as well as nickel, tin, graphite, carbon black, and mixtures thereof.

The plurality of electrically conductive nodes 300 is disposed between the first unipolar plate 200 and the second unipolar plate 202 and distributed across an area defined, for example, by a length 302 and a width 304 of the coolant flowfield 230. In particular embodiments, the plurality of electrically conductive nodes 300 is substantially evenly distributed across the area of the coolant flowfield 230. In further embodiments, the nodes 300 may be provided in a matrix or an array, such as nodes 300 disposed every 20 mm (20 mm×20 mm array). Similar arrays may be provided with other distributions, for example 5 mm×5 mm arrays, 10 mm×10 mm arrays, and 15 mm×15 mm arrays, for example. It should be understood that other distributions of the electrically conductive nodes 300 may be used as desired.

With reference to FIG. 4a, a non-nested configuration of the first and second unipolar plates 200, 202 is provided. In this embodiment, the plurality of conductive nodes 300 is disposed between adjacent flow channels 206, 400 of the first and second unipolar plates 200, 202, for example. Thus, the plurality of electrically conductive nodes 300 are adapted to fuse the coolant lands 402, 228 of the first and second unipolar plates 200, 202, thereby bonding the bipolar plate assembly 8 and forming the coolant flowfield 230.

Referring now to FIG. 4b, a nested configuration of the first and second unipolar plates 200, 202 is provided. Nonlimiting examples of nested configurations are described by Goebel in U.S. Pat. No. 6,974,648 and Goebel et al. in U.S. Pat. App. Pub. No. 2006/0127706, the disclosures of which are incorporated herein by reference in their entireties. In the nested configuration, the plurality of conductive nodes 300 is disposed between the plurality of first lands 208 and the plurality of second flow channels 400, for example. In particular embodiments, the nested configuration includes the first unipolar plate 200 having the plurality of first flow channels 206 and the plurality of first lands 208. The plurality of first flow channels and lands 206, 208 may have different dimensions than the plurality of second flow channels 400 and the plurality of second lands 404 of the second unipolar plate 202. That is, the first and second unipolar plates 200, 202 are nested when stacked. Thus, the plurality of electrically conductive nodes 300 is adapted to fuse the plurality of second coolant lands 228 formed in the second unipolar plate to the plurality of first coolant channels 406 formed in the first unipolar plate 200.

In a nonlimiting example, the distribution density of the plurality of electrically conductive nodes 300 is from about 0.10 nodes per cm$^2$ to about 10 nodes per cm$^2$. In a particular embodiment, the distribution density of the plurality of electrically conductive nodes is from about 0.25 nodes per cm$^2$ to about 4 nodes per cm$^2$. In one embodiment according to the present disclosure, the distribution density of the plurality of electrically conductive nodes is about 1 node per cm$^2$. A skilled artisan should understand that other distribution densities may be used as desired and may depend, for example, on the particular coolant flowfield 300 design chosen.

The average size of each of the plurality of electrically conductive nodes 300 is generally selected as desired. As a nonlimiting example, the average size of the nodes 300 is selected to minimize the amount of material required for bonding of the first unipolar plate 200 and the second unipolar plate 202. In a further example, the average size of the nodes 300 is selected to provide an acceptable voltage drop between the first unipolar plate 200 and the second unipolar plate 202 while the fuel cell stack 2 is in operation. In illustrative embodiments of the present disclosure, at least one of the plurality of electrically conductive nodes 300 has an average diameter of less than about 0.5 mm. In further embodiments, at least one of the plurality of electrically conductive nodes 300 has an average diameter of less than about 0.3 mm. In particular embodiments, at least one of the plurality of electrically conductive nodes 300 has an average diameter of less than about 0.1 mm. As a nonlimiting example, each of the plurality of electrically conductive nodes 300 employed to bond the first and second unipolar plates 200, 202 has an average diameter of about 0.1 mm.

In particular embodiments according to the present disclosure, the distribution density and the node size of the plurality of electrically conductive nodes 300 is sufficient to provide a voltage drop of less than about 4 mV at a current density of 1 A/cm$^2$ under fuel cell stack 2 operating pressures. In a particularly illustrative embodiment, the plurality of electrically conductive nodes 300 have the distribution density and the node size sufficient to provide a voltage drop of less than about 2 mV at the current density of 1 A/cm$^2$ under fuel cell stack 2 operating pressures. As a nonlimiting example, the voltage drop experienced with the plurality of electrically conductive nodes 300 is less than about 1 mV at the current density of 1 A/cm$^2$ under fuel cell stack 2 operating pressures. A skilled artisan should understand that the voltage drop may be selected as desired, for example, based upon variables such as the distribution density, the average size off the individual nodes 300, and the materials selected for the nodes 300. It should further be appreciated that the distribution density and the average size of the individual nodes 300 may be chosen as desired to minimize the voltage drop.

With renewed references to FIGS. 2a and 2b, the first perimeter flange 216 and the second perimeter flange 218 are joined to seal the perimeter 220. In particular embodiments, the first perimeter flange 216 is joined with the second perimeter flange 218 to form a hermetic seal therebetween. The hermetic seal is adapted to provide a fluid-tight enclosure between the first unipolar plate 200 and the second unipolar plate 202 at the junction of the first perimeter flange 216 and the second perimeter flange 218. The fluid-tight enclosure militates against a transport of a fluid therethrough.

In particular embodiments, the hermetic seal is formed from one of a weld, a solder joint, a braze joint, and an adhesive between the first unipolar plate 200 and the second unipolar plate 202 adjacent the perimeter 220. It should be appreciated that the hermetic seal may be formed by other means as desired. As a nonlimiting example, a polymeric seal (not shown) is further disposed between the first and second unipolar plates 200, 202 and circumscribes the coolant flowfield 230. The seal is adapted to further hermetically seal the first and second perimeter flanges 216, 218.

A method for preparing the bipolar plate assembly 8 of the present disclosure is further provided. The method first includes the steps of providing the first unipolar plate 200 having the first inner surface 222 and providing the second unipolar plate 200 having the second inner surface 224. It should be understood that, based on the method employed to provide the unipolar plates 200, 202, that a trimming of excess material from the forming process may be required.

The method further includes positioning the first inner surface 222 adjacent the second inner surface 224, for example, by placing the first unipolar plate 200 and the second unipolar plate 202 in substantially vertical alignment. The positioning of the first and second inner surfaces 222, 224 is accomplished by placing with first and second unipolar plates 200, 202 in a suitable clamping fixture, for example. The positioning of the first inner surface 222 and the second inner surface may further include applying a pressure, for example by creating a partial vacuum between the first unipolar plate 200 and the second unipolar plate 202. In further embodiments, the first and second unipolar plates 200, 202 are simply clamped by applying a force or pressure to the assembled sheets. It should be appreciated that other means for applying a pressure sufficient to ensure contact of the first and second unipolar plates 200, 202 during joining may be used as desired.

The method for preparing the bipolar plate assembly 8 further includes a step of bonding the first unipolar plate 200 and the second unipolar plate 202 with the plurality of localized electrically conductive nodes 300. The bonding is accomplished, for example, by at least one of welding, soldering, brazing, and joining the first and second unipolar plates 200, 202 with an adhesive, as described herein. As nonlimiting examples, the welding includes at least one of laser welding, resistance welding, and electron-beam welding. In another example, the welding includes projection welding. In a particularly illustrative embodiment, the step of bonding the first unipolar plate 200 and the second unipolar plate 202 includes resistance spot welding (RSW). It should be appreciated that other suitable methods for forming the plurality of electrically conductive nodes between the unipolar plates 200, 202 may be used as desired.

In another embodiment, the method for preparing the bipolar plate assembly 8 includes providing localized quantities of the adhesive between the first and second unipolar plates 200, 202. For example, the adhesive is provided as localized beads in a matrix between the first and second unipolar plates 200, 202. In the case of thermoplastic adhesive, the beads may be subsequently melted and cooled to solidify and affix the first inner surface 222 to the second inner surface 224. The beads may also be cured, in the case of thermosetting polymers, to form the plurality of electrically conductive nodes 300. In other embodiments, a layer of the adhesive may be applied between the first and second unipolar plates 200, 202 and a thermal energy applied to localized regions, thereby curing the adhesive and producing the plurality of nodes 300. One of ordinary skill should appreciate that other means for providing localized quantities of the electrically conductive adhesive may be used as desired.

In a further embodiment according to the present disclosure, the method for preparing the bipolar plate assembly 8 includes the step of joining the first and second perimeter flanges 216, 218 to form a hermetic seal. As with the forming of the plurality of localized electrically conductive nodes 300, the joining of the flanges 216, 218 to form the hermetic seal are performed by at least one of welding, soldering, brazing, and employment of an adhesive. In a particular embodiment, the hermetic seal is formed by laser welding (LW). A skilled artisan should understand that alternative means for forming the hermetic seal may be used as desired.

As a nonlimiting example, the step of bonding the first unipolar plate 200 and the second unipolar plate 202 may include applying an electrically conductive adhesive, for example a thermosetting polymer, between the first and second inner surfaces 222, 224. The bonding is then performed as described herein by forming the plurality of electrically conductive nodes 300, for example, by resistance spot welding. The bonded bipolar plate assembly 8 is then heated to a temperature where the thermosetting polymer is cured, thereby forming a hermetic seal at the perimeter 220 of the bipolar plate assembly.

The bonding of the first and second unipolar plates 200, 202 may be conducted in a substantially oxygen-free atmosphere. In particular embodiments, the bonding is conducted in a moisture-free atmosphere. In an illustrative example, the bonding occurs under a dry inert atmosphere, for example, nitrogen, argon, or the like. It should be appreciated that other suitable atmospheres may be used as desired.

It is surprisingly found that the plurality of electrically conductive nodes 300 provides a stable, low-electrical resistance pathway between the first and second unipolar plates 200, 202. One of ordinary skill should appreciate that such a pathway is now provided with an optimized quantity of material used to bond the unipolar plates 200, 202. The methods of the disclosure may also be more rapidly performed in comparison to conventional processes for preparing fully-bonded bipolar plate assemblies.

A skilled artisan should understand the plurality of conductive nodes 300 of the disclosure provides a greater amount of mechanical reinforcement under compression than is observed with conventional bipolar plate assemblies 8 having merely an electrically conductive coating on the inner surfaces 222, 224. The mechanical reinforcement provided by the plurality of conductive nodes is desirable under circumstances when a later force is applied to the fuel cell stack 2, for example during handling maneuvers of a vehicle powered by the fuel cell stack 2. The mechanical reinforcement militates against an "accordion" effect in the fuel cell stack 2 under such conditions.

It is further surprisingly found that the first and second unipolar plates 200, 202 having a coating on at least one of the active surfaces 204, 210 and the inner surfaces 222, 224 are able to be spot welded and provide the plurality of electrically conductive nodes 300 according to the present disclosure. Similarly, with respect to unipolar plates 200, 202 formed from composite materials, it is unexpectedly discovered that the plurality of conductive nodes allows a practitioner to forgo the buffing or removal of a skin layer of polymer (to expose graphite for electrical contact) that forms on such composite materials. Such a step is typically required with conventional bipolar plate assemblies 8 formed from composite materials.

Example

As can be observed in TABLE I, voltage drop (resistance) measurements were obtained from sample coupons including the plurality of electrically conductive nodes as described herein. It should be appreciated that the present disclosure is not limited by the samples described herein.

TABLE 1

| Coupon Voltage Drop (Resistance) | | | | |
|---|---|---|---|---|
| Compression Pressure (psi) | Node Diameter (mm) | Number of Nodes | Array (mm × mm) | Voltage Drop (mV) |
| 100 | 0.07 | 400 | (5 × 5) | 1.7 |
| 100 | 0.07 | 100 | (10 × 10) | 2.6 |
| 100 | 0.07 | 25 | (20 × 20) | 5.3 |
| 100 | 0.1 | 400 | (5 × 5) | 1.1 |
| 100 | 0.1 | 100 | (10 × 10) | 2.9 |
| 100 | 0.1 | 25 | (20 × 20) | 0.9 |
| 100 | 0.2 | 400 | (5 × 5) | 2.8 |
| 100 | 0.2 | 100 | (10 × 10) | 1.3 |
| 100 | 0.2 | 25 | (20 × 20) | 0.6 |
| 200 | 0.07 | 400 | (5 × 5) | 1.1 |
| 200 | 0.07 | 100 | (10 × 10) | 1.8 |
| 200 | 0.07 | 25 | (20 × 20) | 5.0 |
| 200 | 0.1 | 400 | (5 × 5) | 0.6 |
| 200 | 0.1 | 100 | (10 × 10) | 1.7 |
| 200 | 0.1 | 25 | (20 × 20) | 1.0 |
| 200 | 0.2 | 400 | (5 × 5) | 1.8 |
| 200 | 0.2 | 100 | (10 × 10) | 1.1 |
| 200 | 0.2 | 25 | (20 × 20) | 1.0 |
| 300 | 0.07 | 400 | (5 × 5) | 0.8 |
| 300 | 0.07 | 100 | (10 × 10) | 1.6 |
| 300 | 0.07 | 25 | (20 × 20) | 4.8 |
| 300 | 0.1 | 400 | (5 × 5) | 0.6 |
| 300 | 0.1 | 100 | (10 × 10) | 1.1 |
| 300 | 0.1 | 25 | (20 × 20) | 1.2 |
| 300 | 0.2 | 400 | (5 × 5) | 1.4 |
| 300 | 0.2 | 100 | (10 × 10) | 1.1 |
| 300 | 0.2 | 25 | (20 × 20) | 1.4 |
| 400 | 0.07 | 400 | (5 × 5) | 0.4 |

TABLE 1-continued

Coupon Voltage Drop (Resistance)

| Compression Pressure (psi) | Node Diameter (mm) | Number of Nodes | Array (mm × mm) | Voltage Drop (mV) |
|---|---|---|---|---|
| 400 | 0.07 | 100 | (10 × 10) | 1.8 |
| 400 | 0.07 | 25 | (20 × 20) | 4.9 |
| 400 | 0.1 | 400 | (5 × 5) | 0.4 |
| 400 | 0.1 | 100 | (10 × 10) | 0.7 |
| 400 | 0.1 | 25 | (20 × 20) | 1.4 |
| 400 | 0.2 | 400 | (5 × 5) | 1.1 |
| 400 | 0.2 | 100 | (10 × 10) | 0.9 |
| 400 | 0.2 | 25 | (20 × 20) | 1.7 |

Samples formed from 316L stainless steel coupons were provided for preparation in accordance with the present disclosure. The dimensions of the coupons were approximately 100 mm×100 mm. The coupons were separated into pairs and placed into a clamping fixture. The paired coupons were then joined by resistance spot welding (RSW) to provide the pluralities of electrically conductive stainless steel nodes. The various configurations of electrically conductive nodes included the following arrays: 5 mm×5 mm arrays having a total number of 400 nodes; 10 mm×10 mm arrays having a total number of 100 welds; and 20 mm×20 mm arrays having a total number of 25 welds. Various node sizes were also provided, and included nodes having about 0.7 mm, about 1.0 mm, and about 2.0 mm diameters.

The voltage drop of the coupons having the pluralities of electrically conductive nodes were tested by methods known in the art. A testing apparatus including a carver press with a pair of gold coated platens was provided. The samples were individually sandwiched between a first and a second electrically conductive carbon paper media (1 mm Toray carbon paper, commercially available from Toray Industries, Inc.) and the gold coated platens. A current of 1 A/cm$^2$ was applied by a direct current supply (e.g., a Xantrex XFR12-100 DC Power Supply) to the pair of gold coated platens. The voltage drop was measured across the pair of bonded coupons forming the individual samples. The voltage drop of the individual samples were measured at four increments of compressive force: 100 psi (690 kPa), 200 psi (1380 kPa), 300 psi (2070 kPa), and 400 psi (2760 kPa).

As illustrated in TABLE 1, the samples having the plurality of electrically conductive nodes may have an average voltage drop of less than about 3 mV, in particular configurations less than about 2 mV, and in particularly illustrative configurations less than about 1 mV. It should be understood that the compression load on a fuel cell stack under conventional operation conditions is typically between about 200 psi and about 400 psi. Thus, one of ordinary skill in the art should appreciate that the plurality of electrically conductive nodes surprisingly provides an acceptable contact resistance through the range of typically applied loads.

While certain representative embodiments and details have been shown for purposes of illustrating the invention, it will be apparent to those skilled in the art that various changes may be made without departing from the scope of the disclosure, which is further described in the following appended claims.

What is claimed is:

1. A bipolar plate assembly for a fuel cell, comprising:
    a first unipolar plate having a plurality of first lands disposed between a plurality of first flow channels; and
    a second unipolar plate having a plurality of second lands disposed between a plurality of second flow channels; wherein the first unipolar plate is disposed adjacent the second unipolar plate and at least one of the first lands is bonded to a corresponding one of the second lands by at least two localized electrically conductive nodes.

2. The bipolar plate assembly of claim 1, wherein the first flow channels of the first unipolar plate are first coolant channels formed in a first inner surface thereof and the second flow channels of the second unipolar plate are second coolant channels formed in a second inner surface thereof, wherein the first coolant channels and the second coolant channels cooperate to form a coolant flowfield in the bipolar plate assembly.

3. The bipolar plate assembly of claim 1, wherein a first perimeter flange of the first unipolar plate is joined with a second perimeter flange of the second unipolar plate to form a substantially hermetic seal therebetween.

4. The bipolar plate assembly of claim 3, wherein the seal is formed from one of a weld, a solder joint, a braze joint, and an adhesive.

5. The bipolar plate assembly of claim 1, wherein at least one of the first unipolar plate and the second unipolar plate have a hydrophilic coating deposited thereon.

6. The bipolar plate assembly of claim 1, wherein the nodes have an average diameter of less than about 0.3 mm.

7. The bipolar plate assembly of claim 6, wherein the nodes have an average diameter of about 0.1 mm.

8. The bipolar plate assembly of claim 1, wherein an average quantity of the nodes located on a square centimeter of a surface of at least one of the first unipolar plate and the second unipolar plate is between about 0.25 nodes/cm$^2$ to about 4 nodes/cm$^2$.

9. The bipolar plate assembly of claim 1, wherein a voltage drop between the first unipolar plate and the second unipolar plate is less than about 2 mV at a current density of 1 A/cm$^2$.

10. The bipolar plate assembly of claim 1, wherein the nodes are formed from at least one of a weld, a solder joint, a braze joint, and an adhesive.

11. The bipolar plate assembly of claim 10, wherein the nodes are formed by a spot weld.

12. The bipolar plate assembly of claim 1, wherein at least one of the first unipolar plate and the second unipolar plate is formed from one of a metal, graphite, and a composite material.

13. The bipolar plate assembly of claim 1, wherein the first unipolar plate and the second unipolar plate are formed from stainless steel.

14. A fuel cell stack comprising:
    a plurality of membrane electrode assemblies arranged in a stacked configuration, each of the plurality of membrane electrode assemblies having a cathode and an anode; and
    a bipolar plate assembly disposed between adjacent membrane electrode assemblies, the bipolar plate assembly including a first unipolar plate having a plurality of first lands disposed between a plurality of first flow channels and a second unipolar plate having having a plurality of second lands disposed between a plurality of second flow channels, wherein the first unipolar plate is disposed adjacent the second unipolar plate and at least one of the first lands is bonded to a corresponding one of the second lands by at least two localized electrically conductive nodes.

15. A method for preparing a bipolar plate assembly for a fuel cell stack, comprising the steps of:
    providing a first unipolar plate having a first inner surface and a plurality of first lands disposed between a plurality of first flow channels;

providing a second unipolar plate having a second inner surface and a plurality of second lands disposed between a plurality of second flow channels;

positioning the first inner surface adjacent the second inner surface; and bonding at least one of the first lands to a corresponding one of the second lands by at least two localized electrically conductive nodes.

16. The method of claim 15, wherein the first unipolar plate and the second unipolar plate are positioned within a clamping fixture.

17. The method of claim 15, wherein the step of bonding the first unipolar late and the second unipolar plate includes spot welding.

18. The method of claim 15, further comprising the step of joining a first perimeter flange of the first unipolar plate with a second perimeter flange of the second unipolar plate, wherein a substantially hermetic seal is formed.

19. The method of claim 18, wherein the step of joining the first and second perimeter flanges includes laser welding.

20. The bipolar plate assembly of claim 1, wherein a distance a central point of each of the plurality of nodes is spaced apart from a central point of an adjacent node along at least one of a length and a width of the first and second unipolar plates is greater than a maximum diameter of each of the nodes.

* * * * *